Feb. 16, 1954

M. P. PRACHE 2,669,603

TRANSMISSION LINE WITH MAGNETIC LOADING

Filed Dec. 29, 1951

2 Sheets-Sheet 1

Feb. 16, 1954 M. P. PRACHE 2,669,603

TRANSMISSION LINE WITH MAGNETIC LOADING

Filed Dec. 29, 1951

2 Sheets-Sheet 2

Patented Feb. 16, 1954

2,669,603

UNITED STATES PATENT OFFICE 2,669,603

TRANSMISSION LINE WITH MAGNETIC LOADING

Marie Pierre Prache, Versailles, France, assignor to Lignes Telegraphiques & Telephoniques, a corporation of France Application December 29, 1951, Serial No. 264,207

Claims priority, application France January 31, 1951

9 Claims. (Cl. 178—45)

Figure 1:
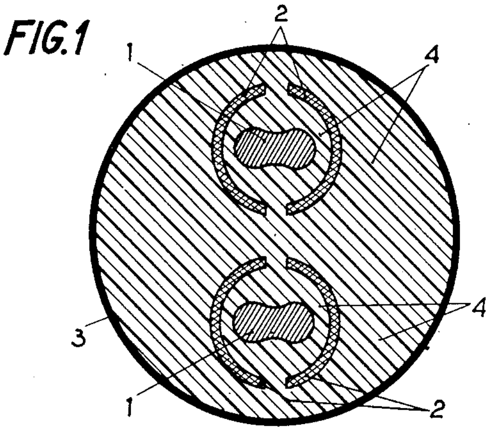

The present invention relates to magnetically loaded high frequency transmission lines having a low attenuation per unit length.

More specifically, it relates to low attenuation high frequency transmission lines provided with a magnetic loading made up of magnetic loading made up of magnetic elements of a particular geometric shape, these lines being further characterized by the use of conductors of a particular cross-section shape especially adapted to take full advantage of the improvement in their transmission characteristics associated with magnetic loading.

Various forms of magnetically loaded lines have been previously proposed, the purpose aimed at by loading the conductors of a circuit with magnetically permeable elements being that of increasing their inductance and thereby decreasing their attenuation per unit length, the obtention of this result being subject to the double condition that the apparent high-frequency resistance of the conductors be not increased by extra losses in the magnetic material or in the conductors themselves and that the capacity per unit length of the line be not unduly increased by the presence of the said magnetic material, which usually is electrically conductive or, if not, has a high dielectric constant.

The latter condition shows that, to achieve the desired result, a magnetic material of high permeability must be used, so as to obtain a noticeable increase of inductance without filling at the same time a too large portion of the dielectric space available between the conductors.

For this purpose, several methods of construction have been previously proposed.

It is known for instance that continuous loading of transmission lines, in the form sometimes called "Krarup loading," has been previously realized, for example, by directly winding magnetic metal strips or wires around the circuit conductors. This method of manufacture offers numerous drawbacks which make its utilization practically impossible for conductors through which currents at frequencies higher than voice frequencies are flowing. The reason for this fact is, as it has been shown by F. Breisig ("Theoretische Telegraphie, Vieweg und Sohn, Brunschweig, 1924 p. 416); by U. Meyer ("Das magnestische Feld von Krarupdrähten," Elektrische Nachrichtentechnik, volume I, Heft 5, November 1924, p. 152 to 157) and by K. W. Wagner ("Ueber die Schraubenstruktur des Magnetfeldes in Krarupleitern," Elektrische Nachrichtentechnik, volume I, Heft 5, November 1924, p. 157 to 159), that, in such a construction, the magnetic flux tends to follow the direction of the ferro-magnetic metal wires or strips. As a result, the magnetic field in the metal assumes a much too high value. This field is thus high enough to cause heavy eddy current losses which become prohibitive for the operation of circuits by means of high frequency currents. Due to the magnitude of the magnetic field in the metal, the hysteresis losses are also high, which causes non-linear distortion and, consequently, cross-talk between channels in multiple operation of circuits by means of carrier currents of staggered frequencies.

To obviate the just described drawbacks, it has been proposed to use as magnetic loading of transmission lines magnetic elements made of compressed magnetic powder material agglomerated by an insulating material or of materials such as ferrites, which are endowed with a high magnetic permeability and at the same time with a high resistivity. However, it has been found that the magnetic permeability of the former is usually too low to yield any result of practical value, and that the hysteresis losses of the latter are much too high to allow dispensing with air gaps disposed in the path of the lines of magnetic force. As it is well known, the effect of the air gaps, which could be better termed "dielectric gaps," is to decrease hysteresis losses and generally all detrimental effects liable to cause non-linear distortion. On another hand, it has been found that the presence of the dielectric gaps results in an undesirable modification of the high frequency current density distribution in the cross-section of the conductors, at least in the case of cylindrical conductors of circular cross-sections. This fact, which has been experimentally ascertained, may be explained as follows:

It is well known that, due to the "skin effect," high frequency currents are propagated only through a very thin layer of the metal in the vicinity of the surface of the conductors. If the current density per unit length is constant along this surface, the effective resistance of the conductors, therefore, is inversely proportional to the length of the periphery of its cross section.

From this standpoint, circular cross-section conductors are the most unfavorable, since, for a given peripheral length they offer the largest area and, consequently require the largest amount of metal for a given longitudinal resistance. Further, the existence of a relatively large amount of useless metal in the inner portion of the conductors increases the area of the cross section of the circuits and, consequently, the amount of metal necessary for the manufacturing of a cable sheath able to contain them.

One has been compelled, however, in the circuits realized heretofore, to use conductors having a circular or almost circular cross-section, since, on differently shaped conductors, the proximity effect concentrates the electric current in the regions of high curvature of these conductors, which considerably increases their effective resistance.

On another hand, it is shown, in textbooks on electricity, for instance in the book "Electromagnetic Waves" by S. A. Schelkunoff edited by Van Nostrand, 1943, p. 74, that, at high frequencies, the electric current density at the surface of conductors is represented by a vector perpendicular to and of magnitude equal to that of the tangential component of the external magnetic field in the immediate vicinity of this surface, both field and current being measured in M. K. S. units.

It is then easy to understand that, in that region of the periphery of a circular cross-section conductor surrounded by a magnetic element provided with an air gap which is next to the said air gap, the lines of magnetic force diverge and cause an increase of the magnitude of the magnetic field in the vicinity of the said region and thereby a local increase of the current density in this cylindrical conductor. There will exist, therefore, a non-uniform distribution of current around the periphery of the said cross-section, a condition that is well known to result in an increase of the high frequency resistance of the conductor.

The main object of the method of construction of a transmission line, the object of the present invention, is to avoid the last mentioned drawback, this being achieved by combining magnetic loading using air gaps with conductors of appropriate cross-section shape while retaining the advantages of loading by magnetic elements.

According to the present invention, there are provided high frequency transmission lines comprising two cylindrical electrical conductors, the inductance per unit length of which is increased by means of cylindrical magnetic material elements in the form of thin shells, hereinafter called, for short, "magnetic shells" and wherein at least one of the said conductors is surrounded by two or more such magnetic shells of cylindrical shape, the generatrices of the surface of which are parallel with those of the conductors, each of the said shells partially surrounding the periphery of the conductor or conductors and being separated by dielectric gaps from the other shells, while the shape of the cross-section of one at least of the said conductors widely differs from the circular shape, the periphery of the cross-section of at least one of the conductors being of a shape such that the longest diameter of the said cross-section be at least twice its shortest diameter.

The main advantage of the method of construction of transmission lines according to the invention is a decrease of attenuation per unit length, compared with conventional loaded or unloaded circuits of comparable size. The decrease in attenuation is due to a more favorable current distribution of high frequency circuits along the surface of the conductors, as will be hereinafter explained.

It should be understood that the data relating to the arrangement of the cross-sections of conductors and magnetic shells, according to the invention and as herein given, can only be defined from experimental results, a mathematical determination of optimum dimensioning not being within the grasp of presently known calculation methods.

The method of increasing the inductance of a transmission line according to the invention will be hereinafter referred to by its usual name of "continuous loading" but it should be understood, however, that it may be applied to the conductors along their length, in a discontinuous manner, within the scope of the invention.

As hereinabove mentioned, the magnetic "shells" used, according to the method of construction which is the object of the present invention, are magnetic circuit elements consisting of cylindrical bodies made of a magnetically permeable material. The term "cylindrical body" should be taken in its broadest sense, that is a solid body limited by an outer cylindrical surface of any cross-section and by two planes substantially perpendicular to the generatrices of the cylindrical surface. The cross-section of the cylinder will preferably offer an elongated shape, i. e. one of its dimensions, which will be termed "thickness," is assumed to be small with respect to the other one. It may assume the shape of a rectangle or the shape resulting from the deformation of a rectangle by a curving of its longer sides, this curving, however, not being such as to bring the ends of said longer sides closer to one another. These longer sides may thus offer any shape, such as an arc of circumference, an arc of an ellipse, a U, a V, etc.

The shells just described may be manufactured by the usual method of sintering of powdered materials, eventually followed by a heat treatment. They may, for instance, be made of "ferrites." The designation "ferrite" applying to chemical compounds according to the formula $Fe_2O_4M$, M designating a bivalent metal, as well as to solid solutions resulting from the mixing of several such compounds, the said compounds being treated by known processes to endow them with good magnetic properties.

The magnetic shells may also and preferably be made, according to an embodiment which is the object of my copending U. S. patent application Ser. No. 264,206 of December 29, 1951, of lengths of very fine ferromagnetic metal wires (by "very fine" are understood wires of a diameter lesser than 0.04 millimeter, i. e. 0.0016 inch) individually coated with an insulating material and so arranged that their axes form an angle between 50 and 90 degrees with the generatrices of the cylindrical surface, the said wires being agglomerated into a solid body by an impregnating insulating material. Such shells can be manufactured by a process described in the said U. S. patent application No. 264,206.

The continuous loading of a transmission line according to the invention will be realized by arranging around one or more conductors of the circuit shells of one of the above descriptions. However, full advantage of the improvement in transmission characteristics brought by the method of construction which is the object of the invention can only be taken subject to the condition that magnetic shells of the most appropriate shape be used.

In a preferred embodiment of the invention, the shells are arranged in such a way that the generatrices of their cylindrical surfaces be parallel with those of the conductors, and that each shell cover only part of the periphery of the cross-section of the conductors, leaving between these shells the intervals called "dielectric gaps." To give the line some mechanical flexibility, comparatively short shells are preferably placed end to end, leaving between them a very small interval. This method makes it possible to obtain a loading giving, for the same bulk of the circuit, an attenuation very much lower than that of the lines realized heretofore.

It should be recalled (see, for instance, Prache and Cazenave, Mesure de la perméabilité et des pertes sur échantillons droits, Review "Câbles et Transmission," July 1950, pages 216 to 233), that, calling $a$ the ratio of the inductance of a conductor covered with a magnetic coating to that of the conductor covered with the same coating in which an air or dielectric gap has been provided, the insertion of the air gap divides the resistance due to the residual magnetic losses by $a^2$ and the resistance due to hysteresis losses by $a^3$. Thus, by leaving dielectric gaps between the shells, it is possible to decrease considerably the relative influence of the residual magnetic losses and particularly non-linear distortion, which makes it possible to increase the frequency of operation of the circuits.

The dielectric gaps may be practically obtained by coating the edges of the shells with a thin layer of varnish, or else by inserting between these shells one or more thin sheets of insulating material such as paper, drawn polystyrol (styroflex) etc.

Loading by magnetic shells of suitable shape according to the invention then opens a way to new constructional possibilities, due to the fact that it makes it possible to change at will the pattern of the magnetic lines of force. It will thus be possible to realize transmission lines having a small bulk, a small attenuation and a small weight of conducting metal by providing for the insertion of magnetic shells in the line and determining the shapes of the conductors, the shapes of the shells and the mutual positions of the conductors and shells in such a manner that the tangential component of the magnetic field be as constant as possible over the whole periphery of the conductors.

For this determination, use will be made of the fact that due to the high permeability of the shells and the presence of the air gaps the magnetic field in the shells is in the direction of the largest dimension of the cross-section and that its magnitude is always lower than $I/p$; I being the current in a conductor and $p$ the length of the periphery of this cross-section of this conductor, and, on the other hand, of the fact that due to the continuity of the tangential component of the magnetic field at the surface of the shell, the magnetic field, in the vicinity of the shell, cannot exceed the above value. Against this, the magnetic field is high in the whole region located in the vicinity of the air (or dielectric) gaps between shells.

Therefore, the shells will be arranged in such a manner that they be quite close to the conductors, in the high curvature regions of these conductors, and that they then gradually get more remote from them. In addition, dielectric gaps will be placed between the shells, in regions far from the conductors. If it is desired to determine in a more exact manner the shapes of the conductors and shells, one can work by a cut and try method on short lengths of experimental circuits. This cut and try work can be oriented by determining the pattern of the magnetic lines of force by calculation or by the known method using an electrolytic model.

Figure 2:
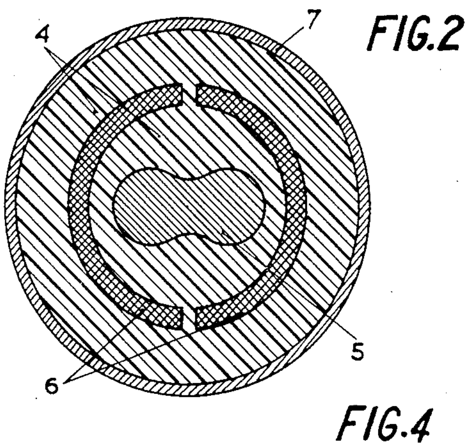
Figure 3:
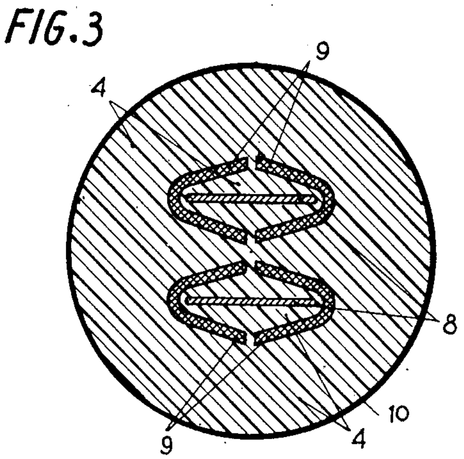
Figure 4:
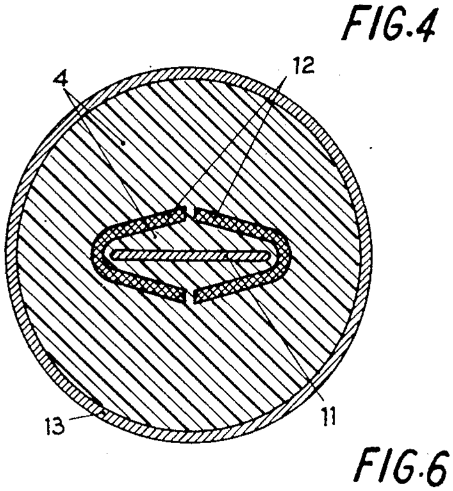
Figure 5:
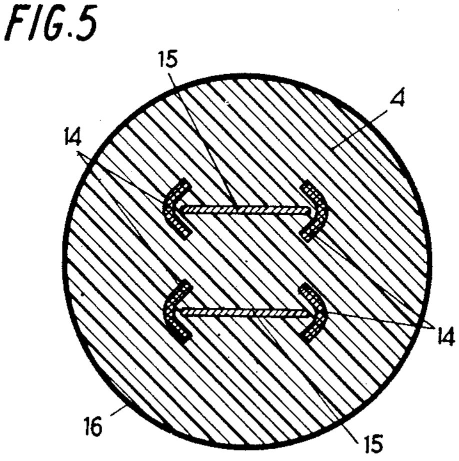
Figure 6:
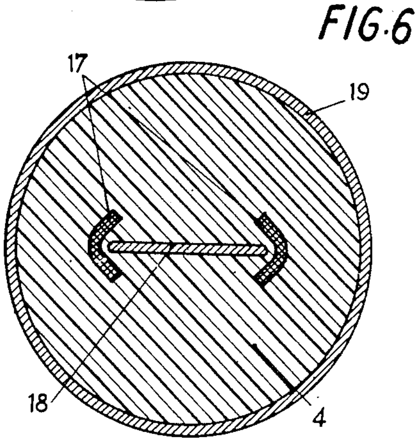
Figure 7:
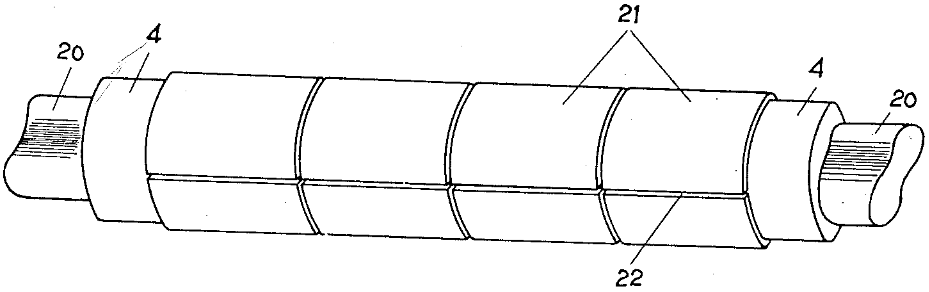
Figure 8:
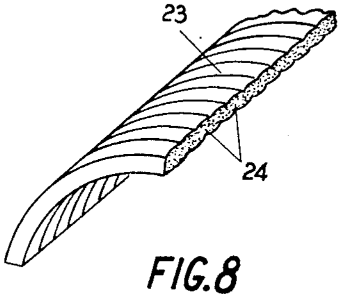

A description of some embodiments of the invention will now be given with reference to the appended drawings wherein Figures 1, 3 and 5 represent, in cross-section, various embodiments of transmission lines of the balanced type according to the invention, while Figures 2, 4 and 6 represent embodiments adapted to lines of the unbalanced type. Figures 7 and 8 respectively show a loaded conductor according to the invention and the geometrical shape of a magnetic shell as used for its loading.

In Figure 7, an elongated cross-section conductor is seen at 20, while magnetic shells of short length 21 for its loading are separated from the said conductor by a solid dielectric 4 and from each other by air or dielectric gaps such as 22.

In Figure 8 is shown a perspective view of a magnetic shell 23, made for instance from very fine insulated and agglomerated wires of magnetic material 24. As seen in Figure 8, the shape of the shell 23 is that of a solid limited by two cylindrical and two plane surfaces. In Figure 7 the shells 21 are arranged in such a position with respect to the conductor 20 that the generatrices of their limiting cylindrical surfaces be parallel to the axis of 20.

Figure 1, for instance, shows the cross-section of a balanced shielded two-conductor line, loaded by magnetic shells 2, 2, 2, 2 of semi-circular cross-section. Such a circuit differs from the conventional constructions in that its conductors 1, 1 have a cross-section of an elongated shape somewhat similar to that of an "eight." The shield 3 is of indifferent shape and has been represented, for simplicity, with a circular cross-section. The dielectric material separating 1, 2 and 3 from each other is shown at 4, the same reference numeral 4 being used for the dielectric in Figures 2 to 6. A line such as that of Fig. 1 may be built in the following way.

The conductors 1, 1 may be covered with a continuous layer of dielectric or else with centering dielectric elements such as styroflex twine or polyethylene washers, up to an outer diameter equal to the inner diameter of the magnetic shells. Two shells 2, 2, the cross-section of which has the shape of that of a half circular cylinder, are then placed on each one of the conductors or on said dielectric elements, leaving between them dielectric gaps obtained as explained above, and eventually covered with a flexible tape of a dielectric such as polystyrol. The assembly of the two conductors may then be covered with a continuous layer of dielectric which may be placed in position by means of an extrusion machine or else covered with centering elements such as dielectric twine or insulating washers, the whole being surrounded by a metal screen 3.

In a similar way, Figure 2 shows an embodiment of an unbalanced line according to the invention in the case where one of its two conductors completely surrounds the other. Such a line can be built by placing around its inner conductor 5 magnetic shells 6, 6 and dielectric 4 by method above described in the case of Figure 1, the whole being thereafter covered by the outer conductor 7. The inner conductor 5 has a cross-section in the shape of an "eight."

Preferred and more economical embodiments of the invention are shown on Figures 3, 4, 5 and 6.

The most economical shape of conductors for high frequencies, i. e. that which allows the greatest saving in metal and consequently the greatest reduction in bulk, is a shape in thin strips or tapes. In the cases of Figures 3 and 5, the two conductors of a balanced line each consist of a thin tape of conducting metal, while in the cases of Figs. 4 and 6, the inner conductor of an unbalanced line is built in a similar way.

Such conductors, however, have not been hitherto in general use because the proximity effect would have concentrated the current in the vicinity of the lateral generatrices of the tapes.

According to the present invention this drawback is avoided by loading these conductors by means of shells, the cross-section of which has the shape of a V with a rounded bottom, and by arranging these shells in such a manner that the inner portion of the bottom of the V be in close vicinity to the edges of the tapes.

A loaded circuit with two such conductors exterior to each other is shown on Figure 3, in which each one of the conductors 8, in the shape of a tape, is loaded with two shells 9, 9 the whole being possibly placed inside a screen 10. A loaded "coaxial" circuit, in a similar way, can be realized as shown on Figure 4, in which the inner tape shaped conductor 11 is loaded by two shells 12, 12, the outer conductor being represented at 13.

The shells are held in position by one of the above described methods.

The above examples relate to transmission lines in which the inductance increase caused by the load is relatively great. This increase causes a large decrease of the attenuation but it entails, as an unavoidable counterpart, a substantial reduction in propagation velocity. In addition, to obtain this large inductance increase, the dielectric gaps have to be maintained at a fairly small length, so that the magnetic induction field in the shells, is fairly large with the result that the eddy current losses set a limit to the maximum utilization frequency of the circuits.

It is, however, possible to build lines with a very high speed of propagation and allowing the transmission of currents of frequencies up to several megacycles per second, i. e. comparable in this respect with non-loaded coaxial pairs, but offering, as compared with the latter, a smaller bulk and a saving in conductor metal. To this effect, conductors as above-described are used, for example, in the shape of thin tapes. Such embodiments of the invention are shown on Figures 5 and 6. Magnetic shells are then used almost exclusively to decrease the proximity effect. A very large spacing is left between them so that they only slightly increase the circuit inductance and consequently decrease its propagation velocity only in a small measure. The total reluctance of the magnetic circuit formed by the shells being then very large, the magnetic induction inside the shells and consequently the eddy current losses are small. Such a line can be operated up to a frequency at least equal to that where the skin effect begins to appear in the magnetic wires composing the shells, if shells made of agglomerated wires are used. For iron alloy wires with 40% nickel, for instance, this frequency is of the order of 2 megacycles per second if the shell is made of 0.018 millimeter wires and 4 megacycles per second if the shell is made of 0.012 millimeter wires.

The line may be given the shape shown on Figure 5, for a balanced circuit and the shape shown on Figure 6 for a "coaxial" circuit. On Figure 5 magnetic shells 14, 14 are arranged at the ends of two tape shaped conductors 15, 15 of the circuit and the whole may be placed inside a metal screen 16. On Figure 6, shells 17, 17 are placed near the ends of the inner tape shaped conductor 18, the outer conductor of which is shown at 19.

By way of example, an experimental balanced transmission line according to the embodiment of the invention represented on Fig. 5 has been realized as follows.

The two conductors 15, 15 consist of parallel copper tapes 4.5 mm. wide and 0.5 mm. thick with a spacing of 5.5 mm. The shield 16 was omitted. Magnetic "shells" in the shape of semicircular tubes, made of agglomerated 0.018 mm. insulated wires of a ferromagnetic alloy including 40% nickel and 60% iron were used, the volume of the wires being about 30% of the total volume of the shells. The internal diameter of each shell was 2.5 mm. and its thickness 0.4 mm. The shells were placed very close to the edges of the tapes and separated from them by a polystyrene tape 0.1 mm. thick. The measured attenuations at 200, 400 and 800 kc./s. were respectively equal to 83.5, 155 and 239 millionths of a Neper per meter, while the propagation velocity was fairly constant and equal to 185,000 kilometers per second.

On an identical circuit without magnetic shells, the corresponding figures for the attenuation were respectively 166.5, 250 and 333 millionths of a Neper per meter.

What is claimed is:

1. A high frequency transmission line comprising a plurality of parallel cylindrical conductors, one at least of which has an elongated cross-sectional shape such that the longest diameter of its cross-section is at least equal to twice the shortest diameter of said cross-section, said transmission line further comprising magnetic circuit elements made of a material of high magnetic permeability and in the shape of solids bounded by a cylindrical surface and by two planes perpendicular to generatrices of said cylindrical surface, said magnetic circuit elements being arranged in the vicinity of said conductors in such a manner that generatrices of their cylindrical surface are parallel to generatrices of the cylindrical surfaces of said conductors and that each of said magnetic circuit elements partly surrounds one of said conductors of elongated cross-sectional shape, each said magnetic circuit element being at the same time arranged so as to leave at least one dielectric gap between itself and any other magnetic circuit element and in such a manner that it is very near to said one conductor of elongated cross-sectional shape in a region of maximum curvature of the periphery of the cross-section of the said one conductor and so as to be more remote from said one conductor in those of its parts which are nearest to a dielectric gap, and dielectric means for insulating said conductors and said magnetic circuit elements from each other.

2. A high frequency transmission line as claimed in claim 1, wherein the magnetic circuit elements are made of ferrite, the designation ferrite being applied to solid solutions resulting from the mixing of chemical compounds, the composition of which is represented by the formula $Fe_2O_4M$, M designating bivalent metals.

3. A high frequency transmission line as claimed in claim 1, wherein the magnetic circuit elements are made of thin wires of ferromagnetic material juxtaposed and agglomerated with an insulating material.

4. A high frequency transmission line as claimed in claim 1, comprising two conductors of elongated cross-sectional shape surrounded by a shield formed by a tubular conductor.

5. A high frequency transmission line as claimed in claim 1, comprising one conductor of elongated cross-sectional shape surrounded by a shield formed by a tubular conductor.

6. A high frequency transmission line as claimed in claim 1, wherein the conductors of elongated cross-sectional shape are constituted by thin tapes of conducting metal.

7. A high frequency transmission line as claimed in claim 6, wherein each said conductor of elongated cross-sectional shape consists of a thin tape of conducting metal surrounded by two magnetic circuit elements arranged in the vicinity of each of said tapes so as to form a nearly closed magnetic circuit and in such a way that each one of said magnetic circuit elements is very near to one edge of said tape, at least one dielectric gap being provided between said two magnetic circuit elements and said gaps being located in a region of said magnetic circuit elements comparatively remote from the edge of said tape.

8. A high frequency line as claimed in claim 6, wherein each said conductor of elongated cross-sectional shape consists of a thin strip of conducting metal surrounded by two magnetic circuit elements arranged in the vicinity of each of said strips so as to form a magnetic circuit with a wide dielectric gap and in such a way that each of said magnetic circuit elements is very near to one edge of said strip.

9. A high frequency transmission line as claimed in claim 6, wherein each said magnetic circuit element has a cross-sectional shape in the form of a V with a rounded bottom, the said bottom being placed in the immediate vicinity of an edge of the said tape.

MARIE PIERRE PRACHE.

References Cited in the file of this patent

UNITED STATES PATENTS

| Number | Name | Date |
|---|---|---|
| 2,029,041 | Strieby | Jan. 28, 1936 |
| 2,228,797 | Wassermann | Jan. 14, 1941 |
| 2,228,798 | Wassermann | Jan. 14, 1941 |

FOREIGN PATENTS

| Number | Country | Date |
|---|---|---|
| 15,217 | Great Britain | of 1893 |
| 407,937 | Germany | Jan. 8, 1925 |